US010626255B2

(12) United States Patent
Galizio et al.

(10) Patent No.: US 10,626,255 B2
(45) Date of Patent: Apr. 21, 2020

(54) PNEUMATIC TIRE HAVING ADVANTAGEOUS LOW TEMPERATURE PERFORMANCE CHARACTERISTICS

(71) Applicant: Bridgestone Americas Tire Operations, LLC, Nashville, TN (US)

(72) Inventors: Benjamin C. Galizio, Kent, OH (US); Amy M. Randall, Brentwood, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 45 days.

(21) Appl. No.: 15/579,357

(22) PCT Filed: Jun. 3, 2016

(86) PCT No.: PCT/US2016/035737
§ 371 (c)(1),
(2) Date: Dec. 4, 2017

(87) PCT Pub. No.: WO2016/196946
PCT Pub. Date: Dec. 8, 2016

(65) Prior Publication Data
US 2018/0148568 A1    May 31, 2018

Related U.S. Application Data

(60) Provisional application No. 62/170,920, filed on Jun. 4, 2015.

(51) Int. Cl.
| | |
|---|---|
| *B60C 1/00* | (2006.01) |
| *C08L 21/00* | (2006.01) |
| *C08J 3/22* | (2006.01) |
| *C08J 3/24* | (2006.01) |
| *C08L 9/06* | (2006.01) |
| *C08L 9/00* | (2006.01) |
| *C08K 5/548* | (2006.01) |
| *C08K 5/11* | (2006.01) |
| *C08K 5/101* | (2006.01) |
| *C08K 5/00* | (2006.01) |
| *C08K 3/04* | (2006.01) |
| *C08K 3/36* | (2006.01) |

(52) U.S. Cl.
CPC ............... *C08L 21/00* (2013.01); *B60C 1/00* (2013.01); *B60C 1/0016* (2013.01); *C08J 3/22* (2013.01); *C08J 3/24* (2013.01); *C08K 5/0025* (2013.01); *C08K 5/101* (2013.01); *C08K 5/11* (2013.01); *C08K 5/548* (2013.01); *C08L 9/00* (2013.01); *C08L 9/06* (2013.01); *C08K 3/04* (2013.01); *C08K 3/36* (2013.01)

(58) Field of Classification Search
CPC ........................................................ B60C 1/00
See application file for complete search history.

(56) References Cited

U.S. PATENT DOCUMENTS

| | | | |
|---|---|---|---|
| 4,567,928 A | 2/1986 | Takiguchi | |
| 7,253,225 B2 | 8/2007 | Labauze et al. | |
| 7,371,791 B2 | 5/2008 | Hattori et al. | |
| 8,507,596 B2 | 8/2013 | Frenkel | |
| 8,568,523 B1 | 10/2013 | Ransom | |
| 8,722,781 B2 | 5/2014 | Kameda et al. | |
| 2002/0147266 A1 | 10/2002 | Rawlinson et al. | |
| 2005/0148713 A1 | 7/2005 | Labauze et al. | |
| 2007/0197688 A1* | 8/2007 | Tsukada | C08J 3/226 523/351 |
| 2010/0252162 A1 | 10/2010 | Wada et al. | |
| 2011/0112213 A1 | 5/2011 | Recker et al. | |
| 2014/0011929 A1 | 1/2014 | Knoll et al. | |
| 2015/0018471 A1 | 1/2015 | Facklam | |
| 2015/0111036 A1 | 4/2015 | Chaudhary et al. | |
| 2015/0114263 A1* | 4/2015 | Facklam | C08K 5/11 106/505 |

FOREIGN PATENT DOCUMENTS

| | | |
|---|---|---|
| WO | 2013/172699 | 11/2013 |
| WO | WO 2014-003892 A2 | 1/2014 |

OTHER PUBLICATIONS

International Search Report for corresponding PCT/US2016/035737 dated Nov. 15, 2016.
Extended European Search Report; EP Application No. 16804535.9; dated Oct. 12, 2018.
Database WPI; Week 198719; Thomson Scientific; AN 1987-132576; XP 002785029; Apr. 3, 1987.
Database WPI; Week 198626; Thomson Scientific; AN 1986-167211; XP 002785027; May 20, 1986.

* cited by examiner

*Primary Examiner* — Michael F Pepitone
(74) *Attorney, Agent, or Firm* — Meredith E. Hooker; Arthur Reginelli

(57) ABSTRACT

A vulcanizable composition for manufacturing a tire component includes a vulcanizable rubber, a curative for the rubber, and a dihydrocarbyl succinate.

23 Claims, No Drawings

PNEUMATIC TIRE HAVING ADVANTAGEOUS LOW TEMPERATURE PERFORMANCE CHARACTERISTICS

CROSS REFERENCE TO RELATED APPLICATIONS

The present application claims the benefit of U.S. Provisional Application Ser. No. 62/170,920 filed Jun. 4, 2015, which is incorporated herein by reference in its entirety.

FIELD OF THE INVENTION

Embodiments of the present invention are directed toward pneumatic tires and tire components having advantageous low temperature performance characteristics. According to one or more embodiments of the invention, a dihydrocarbyl succinate is used in a tire component composition.

BACKGROUND OF THE INVENTION

In the art of making tire components, plasticizers have been used to provide, among other benefits, improved gripping force on a snow or ice surface. The plasticizers can also be employed to improve compound processing characteristics. For example, low-temperature ester-type plasticizers, such as octyl oleate, have been employed to achieve improved gripping force on a snow or ice surface, as disclosed in U.S. Pat. No. 4,567,928.

In an effort to use a larger amount of renewable, sustainable, or environmentally-friendly materials in the manufacture of pneumatic tires, recent efforts have been made to use plasticizers that are derived from natural materials. For example, U.S. Pat. No. 7,253,225 teaches the use of a plasticizing compound comprising at least one vegetable oil; U.S. Publication No. 2011/0112213 teaches a plasticizer produced via at least one biomass-to-liquid process; Publication No. WO 2013/172699 discloses a plasticizer derived from epoxidized palm oil containing not more than 2% oxirane oxygen content for use in the production of motorcycle tire treads; U.S. Pat. No. 7,371,791 discloses a terpene (co)polymer plasticizer derived from resources other than petroleum; and U.S. Publication No. 2010/0252162 discloses an epoxidized soy bean oil plasticizer.

While the prior art contemplates the use of these plasticizers derived from natural materials, tire components made using such plasticizers continue to suffer from poor performance at lower temperatures. Thus, there is a need in the art for a vulcanizable composition that can be used to make tire components, particularly tire treads, having improved low temperature performance.

SUMMARY OF THE INVENTION

One or more embodiments of the present invention provide a vulcanizable composition including a vulcanizable rubber, a curative for the rubber, and a dihydrocarbyl succinate.

Other embodiments of the present invention provide a process for producing a vulcanizable composition, the process comprising mixing a vulcanizable rubber and a dihydrocarbyl succinate to prepare an initial masterbatch, introducing a rubber curative to the masterbatch, and mixing the masterbatch and curative to form a vulcanizable composition.

Still other embodiments of the present invention provide a vulcanizate prepared by vulcanizing a vulcanizable composition including a vulcanizable rubber, a curative for the rubber, and a dihydrocarbyl succinate.

DETAILED DESCRIPTION OF ILLUSTRATIVE EMBODIMENTS

Embodiments of the present invention are based, at least in part, on the discovery of vulcanizable compositions having a vulcanizable rubber, a curative for the rubber, and a dihydrocarbyl succinate. The vulcanizable compositions can be used to make tire components, particularly tire treads, having improved performance at low temperatures, while not otherwise deleteriously impacting properties. While the prior art proposes the use of certain plasticizers that are derived from natural materials, the low temperature performance characteristics obtained by practice of the present invention were unexpected. Accordingly, embodiments of the present invention provide vulcanizable compositions and tire components made therefrom that include a dihydrocarbyl succinate as a partial replacement for petroleum based oils. Other embodiments of the present invention provide vulcanizable compositions and tire components made therefrom that include a dihydrocarbyl succinate as a total replacement for petroleum based oils. As a result, technologically useful tire components are advantageously produced.

Vulcanizable Composition

Vulcanizable compositions of the present invention include a vulcanizable rubber, a curative for the rubber, and a dihydrocarbyl succinate. The vulcanizable compositions may include one or more additional ingredients, such as, but not limited to, fillers, processing oils, processing aids such as zinc oxide and fatty acid, and antidegradents such as antioxidants or antiozonants.

Vulcanizable Rubber

In one or more embodiments, the vulcanizable rubber, which may also be referred to as a rubber or a vulcanizable elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms.

Dihydrocarbyl Succinate

The dihydrocarbyl succinate may be referred to as a disuccinate, a dihydrocarbyl succinate plasticizer, an ester of succinic acid, or a plasticizer derived from succinic acid. Succinic acid has the molecular formula $C_4H_6O_4$. Succinate has the molecular formula $C_4H_4O_4^{-2}$.

In one or more embodiments, a dihydrocarbyl succinate useful in the practice of this invention may be defined by the formula

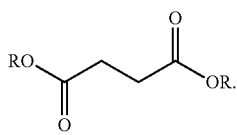

where each R is independently a monovalent organic group.

In one or more embodiments, the monovalent organic groups of the dihydrocarbyl succinate may be hydrocarbyl groups, which include, but are not limited to, alkyl, cycloalkyl, alkenyl, cycloalkenyl, aryl, allyl, aralkyl, alkaryl, or alkynyl groups. Hydrocarbyl groups also include substituted hydrocarbyl groups, which refer to hydrocarbyl groups in which one or more hydrogen atoms have been replaced by a substituent such as a hydrocarbyl, hydrocarbyloxy, silyl, or silyloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, the monovalent organic groups of the dihydrocarbyl succinate are branched. In one or more embodiments, the monovalent organic groups of the dihydrocarbyl succinate are linear.

In one or more embodiments, the monovalent organic groups are the same. In one or more embodiments, the monovalent organic groups are different.

In one or more embodiments, the monovalent organic groups can be selected from the group consisting of 2-ethylhexyl.

A particular dihydrocarbyl succinate is di-(2-ethylhexyl) succinate. Di-(2-ethylhexyl) succinate can also be described as dioctyl succinate or bis(2-ethylhexyl) succinate.

The dihydrocarbyl succinate may also be described as an ester of succinic acid. In one or more embodiments, the dihydrocarbyl succinate includes at least one ester group. In one or more embodiments, the dihydrocarbyl succinate includes two or more ester groups, in other embodiments three or more ester groups, and in other embodiments four or more ester groups. In one or more embodiments, the dihydrocarbyl succinate includes from two to four ester groups.

In certain embodiments, the dihydrocarbyl succinate useful in the present invention can have a molecular weight of at least 200 g/mol, in other embodiments 300 g/mol, in other embodiments 400 g/mol, and in other embodiments 500 g/mol. Additionally or alternatively, in certain embodiments, the dihydrocarbyl succinate useful in the present invention can have a molecular weight of not more than 1200 g/mol, in other embodiments 1000 g/mol, in other embodiments 700 g/mol, and in other embodiments 400 g/mol. In certain embodiments, the dihydrocarbyl succinate useful in the present invention can have a molecular weight of 342 g/mol, or approximate thereto.

In certain embodiments, the dihydrocarbyl succinate useful in the present invention can have a boiling range of between about 150° C. and about 250° C. at an atmospheric pressure. In certain embodiments, the dihydrocarbyl succinate useful in the present invention can have a boiling range of between about 200° C. and about 210° C. at an atmospheric pressure.

In certain embodiments, the dihydrocarbyl succinate useful in the present invention can have a density in the range of between about 0.9 g/cm$^3$ and about 1.0 g/cm$^3$ at 20° C. In certain embodiments, the dihydrocarbyl succinate useful in the present invention can have a density of 0.93 g/cm$^3$ or approximate thereto at 20° C.

In certain embodiments, the dihydrocarbyl succinate useful in the present invention can have a refractive index in the range of between about 1.3 and about 1.6 at 20° C. In certain embodiments, the dihydrocarbyl succinate useful in the present invention can have a refractive index of 1.44 or approximate thereto at 20° C.

In certain embodiments, the dihydrocarbyl succinate useful in the present invention can have a viscosity in the range of between about 10 mPa-sec and about 20 mPa-sec at 20° C. In certain embodiments, the dihydrocarbyl succinate useful in the present invention can have a viscosity of 12 mPa-sec or approximate thereto at 20° C.

In certain embodiments, the dihydrocarbyl succinate useful in the present invention can have an ester content in the range of between about 95% w/w and about 99.8% w/w as measured by gas chromatography. In certain embodiments, the dihydrocarbyl succinate useful in the present invention can have an ester content of 99.5% w/w or approximate thereto as measured by gas chromatography.

In certain embodiments, the dihydrocarbyl succinate useful in the present invention can have an acid value of less than 0.10 mg KOH/g as measured by ASTM D 974 (mod.). In certain embodiments, the dihydrocarbyl succinate useful in the present invention can have an acid value of less than 0.07 mg KOH/g as measured by ASTM D 974 (mod.).

In certain embodiments, the dihydrocarbyl succinate useful in the present invention can have a saponification value in the range of between about 300 and about 350 as measured by ASTM E 1064. In certain embodiments, the dihydrocarbyl succinate useful in the present invention can have a saponification value in the range of between about 322 and about 328 as measured by ASTM E 1064.

The dihydrocarbyl succinate can be produced by any method known in the art. An exemplary method of producing a dihydrocarbyl succinate is the esterification of an acid, such as succinic acid, to the corresponding succinate. Such esterification reactions are generally known to those skilled in the art. These or other esterification reactions may also be described as the trans-esterification process, the direct esterification process, and saponification processes.

The dihydrocarbyl succinate may be produced or may be purchased from commercially available sources, such as OXSLUE™ DOSX from OXEA (OXEA GmbH, Germany; OXEA Corporation, Delaware).

In one or more embodiments, a vulcanizable composition comprises a dihydrocarbyl succinate and is devoid of an epoxidized natural oil. In one or more embodiments, a vulcanizate is prepared from a vulcanizable composition comprising a dihydrocarbyl succinate and being devoid of an epoxidized natural oil.

Filler

As suggested above, the vulcanizable compositions of the invention may include one or more fillers. These filler materials may include reinforcing and non-reinforcing fillers. Exemplary fillers include carbon black, silica, and sundry inorganic fillers.

Useful carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 m²/g and in other embodiments at least 35 m²/g; surface area values can be determined by ASTM D-1765 using the cetyltrimethylammonium bromide (CTAS) technique. The carbon blacks may be in a pelletized form or an unpelletized flocculent form. The preferred form of carbon black may depend upon the type of mixing equipment used to mix the rubber compound.

Examples of suitable silica fillers include precipitated amorphous silica, wet silica (hydrated silicic acid), dry silica (anhydrous silicic acid), fumed silica, calcium silicate, aluminum silicate, magnesium silicate, and the like.

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 m²/g. Useful ranges of surface area include from about 32 to about 400 m²/g, about 100 to about 250 m²/g, and about 150 to about 220 m²/g.

Where one or more silicas is employed, the pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano)tetrasulfides.

Other useful filler materials include sundry inorganic and organic fillers. Examples of organic fillers include starch. Examples of inorganic fillers include silica, aluminum hydroxide, magnesium hydroxide, mica, talc (hydrated magnesium silicate), and clays (hydrated aluminum silicates).

Curatives

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A. Y. Coran, Vulcanization, ENCYCLOPEDIA OF POLYMER SCIENCE AND ENGINEERING, (2$^{nd}$ Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination. The skilled person will be able to readily select the amount of vulcanizing agents to achieve the level of desired cure.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like. The skilled person will be able to readily select the amount of cure accelerators to achieve the level of desired cure.

Other Ingredients

Other ingredients that are typically employed in rubber compounding may also be added to the rubber compositions. These include accelerators, accelerator activators, oils, additional plasticizers, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

In one or more embodiments, a vulcanizable composition comprises a dihydrocarbyl succinate in combination with one or more processing oils. In one or more embodiments, a vulcanizable composition comprises a dihydrocarbyl succinate in combination with one or more additional ester-type plasticizers, such as octyl oleate. In one or more embodiments, a vulcanizable composition comprises one or more processing oils and one or more additional ester-type plasticizers. In one or more embodiments, a vulcanizable composition comprises a combination of two or more dihydrocarbyl succinate.

Where one or more processing oils, one or more additional ester-type plasticizers, an additional dihydrocarbyl succinate, or a combination thereof are used with a dihydrocarbyl succinate, the total combination of these components can be referred to as the total softeners in a vulcanizable composition. The total softeners can also include other low molecular weight additives.

Ingredient Amounts

Rubber

In one or more embodiments, the vulcanizable compositions include at least 20, in other embodiments at least 30, and in other embodiments at least 40 percent by weight of the rubber component, based upon the entire weight of the composition. In these or other embodiments, the vulcanizable compositions include at most 90, in other embodiments at most 70, and in other embodiments at most 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

Total Softeners

In one or more embodiments, the vulcanizable compositions include at least 5, in other embodiments at least 20, and in other embodiments at least 50 parts by weight (pbw) of total softeners per 100 parts by weight rubber (phr). In these or other embodiments, the vulcanizable compositions include at most 85, in other embodiments at most 75, and in other embodiments at most 50 pbw of total softeners phr. In one or more embodiments, the vulcanizable compositions include from about 0.1 to about 75, in other embodiments from about 10 to about 50, and in other embodiments from about 15 to about 20 pbw of total softeners acid phr.

In one or more embodiments, the total softeners include at least 25, in other embodiments at least 50, and in other embodiments at least 75 percent of processing oil. In one or more embodiments, the total softeners include at least 10, in other embodiments at least 15, and in other embodiments at least 20 percent of processing oil. In one or more embodiments, the total softeners include at most 15, in other embodiments at most 25, and in other embodiments at most 50 percent of processing oil.

Dihydrocarbyl Succinate

In one or more embodiments, the vulcanizable compositions include at least 5, in other embodiments at least 10, and in other embodiments at least 50 parts by weight (pbw) of the dihydrocarbyl succinate per 100 parts by weight rubber (phr). In these or other embodiments, the vulcanizable compositions include at most 75, in other embodiments at most 50, and in other embodiments at most 20 pbw of the dihydrocarbyl succinate phr. In one or more embodiments, the vulcanizable compositions include from about 0.1 to about 50, in other embodiments from about 2 to about 20, and in other embodiments from about 5 to about 10 pbw of the dihydrocarbyl succinate phr.

Filler

In one or more embodiments, the vulcanizable compositions include at least 0, in other embodiments at least 10, and in other embodiments at least 20 parts by weight (pbw) of filler per 100 parts by weight rubber (phr). In these or other embodiments, the vulcanizable composition includes at most 200, in other embodiments at most 100, and in other embodiments at most 70 pbw of filler phr. In one or more embodiments, the vulcanizable composition includes from about 0 to about 200, in other embodiments from about 10 to about 100, and in other embodiments from about 20 to about 70 pbw of filler phr.

Carbon Black

In one or more embodiments, the vulcanizable compositions include at least 0, in other embodiments at least 10, and in other embodiments at least 20 parts by weight (pbw) of a carbon black per 100 parts by weight rubber (phr). In these or other embodiments, the vulcanizable composition includes at most 200, in other embodiments at most 100, and in other embodiments at most 70 pbw of a carbon black phr. In one or more embodiments, the vulcanizable composition includes from about 0 to about 200, in other embodiments from about 10 to about 100, and in other embodiments from about 20 to about 70 pbw of a carbon black phr.

Silica

In one or more embodiments, the vulcanizable compositions include at least 5, in other embodiments at least 25, and in other embodiments at least 50 parts by weight (pbw) silica per 100 parts by weight rubber (phr). In these or other embodiments, the vulcanizable composition includes at most 200, in other embodiments at most 130, and in other embodiments at most 80 pbw of the silica phr. In one or more embodiments, the vulcanizable composition includes from about 5 to about 200, in other embodiments from about 25 to about 130, and in other embodiments from about 50 to about 80 pbw of silica phr.

Filler Ratio

In one or more embodiments, the vulcanizable compositions can be characterized by the ratio of the amount of a first filler to the amount of a second filler. In one or more embodiments, the ratio of the amount of carbon black to silica is about 1:1, in other embodiments about 10:1, in other embodiments about 14:1, and in other embodiments about 20:1. In one or more embodiments, the ratio of the amount of carbon black to silica is about 1:5, in other embodiments about 1:10, in other embodiments about 1:14, and in other embodiments about 1:20.

Silica Coupling Agent

In one or more embodiments, the vulcanizable compositions include at least 1, in other embodiments at least 2, and in other embodiments at least 5 parts by weight (pbw) silica coupling agent per 100 parts by weight silica. In these or other embodiments, the vulcanizable composition includes at most 20, in other embodiments at most 15, and in other embodiments at most 10 pbw of the silica coupling agent per 100 parts by weight silica. In one or more embodiments, the vulcanizable composition includes from about 1 to about 20, in other embodiments from about 2 to about 15, and in other embodiments from about 5 to about 10 pbw of silica coupling agent per 100 parts by weight silica.

Process Overview

In one or more embodiments, vulcanizable compositions are prepared by mixing a vulcanizable rubber and a dihydrocarbyl succinate to form a masterbatch, and then subsequently adding a curative to the masterbatch. The preparation of the masterbatch may take place using one or more sub-mixing steps where, for example, one or more ingredients may be added to the composition sequentially after an initial mixture is prepared by mixing two or more ingredients. Also, using conventional technology, additional ingredients can be added in the preparation of the vulcanizable compositions such as, but not limited to, carbon black, additional fillers, chemically-treated inorganic oxide, silica, silica coupling agent, silica dispersing agent, processing oils, processing aids such as zinc oxide and fatty acid, and antidegradents such as antioxidants or antiozonants.

Mixing Conditions

In one or more embodiments, a vulcanizable composition is prepared by first mixing a vulcanizable rubber and a dihydrocarbyl succinate at a temperature of from about 140 to about 180, or in other embodiments from about 150 to about 170° C. In certain embodiments, following the initial mixing, the composition (i.e., masterbatch) is cooled to a temperature of less than 100° C., or in other embodiments less than 80° C., and a curative is added. In certain embodiments, mixing is continued at a temperature of from about 90 to about 110, or in other embodiments from about 95 to about 105° C., to prepare the final vulcanizable composition.

In one or more embodiments, the masterbatch mixing step, or one or more sub-steps of the masterbatch mixing step, may be characterized by the peak temperature obtained by the composition during the mixing. This peak temperature may also be referred to as a drop temperature. In one or more embodiments, the peak temperature of the composition during the masterbatch mixing step may be at least 140, in other embodiments at least 150, and in other embodiments at least 160° C. In these or other embodiments, the peak temperature of the composition during the masterbatch mixing step may be from about 140 to about 200, in other embodiments from about 150 to about 190, and in other embodiments from about 160 to about 180° C.

Final Mixing Step

Following the masterbatch mixing step, a curative or curative system is introduced to the composition and mixing is continued to ultimately form the vulcanizable composition of matter. This mixing step may be referred to as the final mixing step, the curative mixing step, or the productive mixing step. The resultant product from this mixing step may be referred to as the vulcanizable composition.

In one or more embodiments, the final mixing step may be characterized by the peak temperature obtained by the composition during final mixing. As the skilled person will recognize, this temperature may also be referred to as the final drop temperature. In one or more embodiments, the peak temperature of the composition during final mixing may be at most 130, in other embodiments at most 110, and in other embodiments at most 100° C. In these or other embodiments, the peak temperature of the composition during final mixing may be from about 80 to about 130, in other embodiments from about 90 to about 115, and in other embodiments from about 95 to about 105° C.

Mixing Equipment

All ingredients of the vulcanizable compositions can be mixed with standard mixing equipment such as Banbury or Brabender mixers, extruders, kneaders, and two-rolled mills. As suggested above, the ingredients can be mixed in two or more stages. In the first stage (i.e., mixing stage), which typically includes the rubber component and filler, a masterbatch is prepared. Once the masterbatch is prepared, the vulcanizing agents may be introduced and mixed into the masterbatch in a final mixing stage, which is typically conducted at relatively low temperatures so as to reduce the chances of premature vulcanization. Additional mixing stages, sometimes called remills, can be employed between the masterbatch mixing stage and the final mixing stage.

Preparation of Tire

The vulcanizable compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Samples 1-5

Five vulcanizable compositions were prepared according to the recipes provided in Table I below, wherein the numbers are expressed in parts by weight. As shown in Table I, the vulcanizable compositions were prepared by using a masterbatch mixing step. A cure system was then added and mixed in a final mixing step. Generally speaking, the type of processing oil or plasticizer was varied. Table I also provides the results of analytical testing that was performed on the compositions and/or vulcanizates prepared therefrom.

TABLE I

| Ingredients | Samples | | | | |
|---|---|---|---|---|---|
| | 1 | 2 | 3 | 4 | 5 |
| Masterbatch | | | | | |
| Polybutadiene Rubber | 20 | 20 | 20 | 20 | 20 |
| Styrene-Butadiene Rubber w/black oil extension | 110 | 110 | 110 | 110 | 110 |
| N343 Carbon Black | 4 | 4 | 4 | 4 | 4 |
| Silica | 55 | 55 | 55 | 55 | 55 |
| Silica Coupling Agent | 4.84 | 4.84 | 4.84 | 4.84 | 4.84 |
| Black Oil | 10 | | | | |
| Naphthenic Oil | | 10 | | | |
| Di-(2-ethylhexyl) Succinate | | | 10 | 11 | |
| Octyl Oleate | | | | | 10 |
| Stearic Acid | 2 | 2 | 2 | 2 | 2 |
| Antioxidant | 0.95 | 0.95 | 0.95 | 0.95 | 0.95 |
| Wax | 2 | 2 | 2 | 2 | 2 |
| Cure Mix | | | | | |
| Sulfur | 1.5 | 1.5 | 1.5 | 1.5 | 1.5 |
| Accelerator | 1.4 | 1.4 | 1.4 | 1.4 | 1.4 |
| Accelerator | 0.7 | 0.7 | 0.7 | 0.7 | 0.7 |
| Accelerator | 2 | 2 | 2 | 2 | 2 |
| Zinc Oxide | 2.5 | 2.5 | 2.5 | 2.5 | 2.5 |
| Analytical Properties Stress/Strain | | | | | |
| M300 | 6.6 | 6.6 | 6.7 | 6.8 | 5.9 |
| Tensile | 15.2 | 16.7 | 14.4 | 15.0 | 15.1 |
| Elongation | 519 | 551 | 496 | 505 | 553 |
| 100° C. Tb × Eb | 2368 | 2361 | 2339 | 2173 | 2327 |
| Viscoelastic Index | | | | | |
| Wet | 100 | 97 | 93 | 93 | 93 |
| Dry | 100 | 97 | 93 | 93 | 94 |
| CC | 100 | 99 | 99 | 98 | 97 |
| RR | 100 | 101 | 102 | 102 | 102 |
| Snow | 100 | 102 | 105 | 106 | 106 |
| Processing | | | | | |
| t50 | 6.2 | 6.5 | 5.8 | 6.0 | 5.9 |
| t90 | 10.4 | 10.8 | 10.1 | 10.3 | 9.5 |
| RPA G' | 50.1 | 49.6 | 49.5 | 49.5 | 49.6 |
| RPA Scorch | 26.5 | 29.8 | 22.6 | 24.7 | 25.7 |
| Lambourn-Type Wear Index | 100 | 97 | 96 | 96 | 104 |

As shown in Table I, a two-step mixing procedure was employed for Samples 1-5 where the masterbatch were prepared by mixing the ingredients within a pilot-scale Banbury mixer. The polymer was initially added and the mixer was operated at 60 rpm for 30 seconds to mix the polymer. Then, the remaining components of the masterbatch were added and the mixer was operated at 75 rpm until the mixture reached about 155° C. Following preparation of this masterbatch, the mixture is dropped from the mixer, allowed to cool, and then the mixture is reintroduced to the mixer together with the cure mix. Mixing was continued at 40 rpm until the mixture reached about 100° C.

After preparation of each of the vulcanizable compositions, appropriate test specimens were prepared to conduct the various analyses set forth in Table I. Where the analyses took place on cured rubber samples, these samples were prepared by curing an appropriate green sample at 170° C. within a heated press for about 15 minutes.

Tensile mechanical properties of the samples were determined generally following the guidelines and procedure described in ASTM D-412. Dumbbell-shaped samples with a cross-section dimension of 4 mm in width and 1.9 mm in thickness at the center were utilized. Specimens were strained at a constant rate and the resulting force was recorded as a function of extension (strain). Force readings are shown in Table 1 as engineering-stresses by reference to the original cross-sectional area of the test piece. The specimens were tested at 25° C. or 100° C.

Dynamic storage modulus (E') and tan □ values were measured using a dynamic extension test done with an Eplexor™ instrument from Gabo (Germany). The temperature was held constant at the desired temperature: −20° C., 0° C., 30° C., or 60° C. The samples were in dynamic extension under 0.2% strain from −50 to −5° C., and 1% strain from −5 to 65° C., and a constant 52 Hz. A vulcanized composition's E' at −20° C. is generally indicative of its snow traction when incorporated into a tire tread, which is the row in Table 1 labeled "Snow." A vulcanized composition's tan □ at 0° C. is generally indicative of its wet traction when incorporated into a tire tread, which is the row in Table 1 labeled "Wet." A vulcanized composition's E' at 30° C. is generally indicative of its cornering performance when incorporated into a tire tread, which is the row in Table 1 labeled "CC." A vulcanized composition's tan □ at 30° C. is generally indicative of its dry traction when incorporated into a tire tread which is the row in Table 1 labeled "Dry." A vulcanized composition's tan □ at 60° C. is generally indicative of its rolling resistance when incorporated into a tire tread, which is the row in Table 1 labeled "RR."

With respect to the Viscoelastic Index results given in Table 1, the quantitative results for Sample 1 were set to a reference value of 100. The quantitative results for Samples 2-5 are reported with respect to the corresponding reference value of 100 for Sample 1.

The viscosities disclosed herein are real dynamic viscosities determined using a rotorless Rubber Process Analyzer (RPA) instrument from Alpha Technologies (Akron, Ohio). Measurements were made generally following the guidance of ASTM D 6204. In accordance with ASTM D 6204, a three point frequency sweep was conducted. The vulcanized compositions were pre-heated for 1 minute at 130° C. In accordance with the ASTM procedure, strain sweep was conducted at 130° C., and strain at 100 percent and 1 Hz were conducted. The viscosity data reported is from a run conducted at 266° F., G' at 0.2 minutes.

The rheometer measurements were made using a moving die rheometer, MDR 2000™ from Alpha Technologies (Akron, Ohio), which is a rotorless instrument. Measurements were taken at 160° C., 0.5 degree arc, 1.7 Hz, generally following the guidance of ASTM D-5289 and D-2084.

As can be seen from a review and comparison of Samples 1-5, the dihydrocarbyl succinate provides improved "Snow" results (i.e. low temperature performance) without deleteriously affecting any other properties.

Various modifications and alterations that do not depart from the scope and spirit of this invention will become apparent to those skilled in the art. This invention is not to be duly limited to the illustrative embodiments set forth herein.

What is claimed is:

1. A vulcanizable composition comprising:
   (i) a vulcanizable rubber, wherein the vulcanizable rubber is selected from the group consisting of natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof;
   (ii) a curative for the vulcanizable rubber;
   (iii) from about 0.1 to about 50 parts by weight of a dihydrocarbyl succinate per 100 parts by weight of the vulcanizable rubber; and
   (iv) a processing oil selected from the group consisting of aromatic oils, paraffinic oils, naphthenic oils, vegetable oils other than castor oils, low polycyclic aromatic oils including mild extraction solvates, treated distillate aromatic extracts, and super residual aromatic extracts, and heavy naphthenic oils.

2. The vulcanizable composition of claim 1, where the dihydrocarbyl succinate is di-(2-ethylhexyl) succinate.

3. The vulcanizable composition of claim 1, where the vulcanizable composition includes about 2 to about 20 parts by weight of the dihydrocarbyl succinate per 100 parts by weight of the vulcanizable rubber.

4. The vulcanizable composition of claim 1, where the vulcanizable composition includes about 10 parts by weight of the dihydrocarbyl succinate per 100 parts by weight of the vulcanizable rubber.

5. The vulcanizable composition of claim 2, where the vulcanizable composition includes about 10 parts by weight of the di-(2-ethylhexyl) succinate per 100 parts by weight of the vulcanizable rubber.

6. The vulcanizable composition of claim 1, where the dihydrocarbyl succinate is characterized by a molecular weight in the range of from 300 g/mol to 400 g/mol.

7. The vulcanizable composition of claim 1, where the dihydrocarbyl succinate is characterized by an ester content of 99.5% w/w.

8. A process for preparing a vulcanizable composition, the process comprising:
   (i) mixing a vulcanizable rubber, a processing oil, and a dihydrocarbyl succinate to prepare an initial masterbatch, wherein the processing oil is selected from the group consisting of aromatic oils, paraffinic oils, naphthenic oils, vegetable oils other than castor oils, low polycyclic aromatic oils including mild extraction solvates, treated distillate aromatic extracts, and super residual aromatic extracts, and heavy naphthenic oils, and wherein the vulcanizable rubber is selected from the group consisting of natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof;
   (ii) introducing a rubber curative to the masterbatch; and
   (iii) mixing the masterbatch and the rubber curative to form a vulcanizable composition.

9. The process of claim 8, where the dihydrocarbyl succinate is di-(2-ethylhexyl) succinate.

10. The process of claim 8, where the masterbatch comprises about 10 to about 50 parts by weight of the dihydrocarbyl succinate per 100 parts by weight of the vulcanizable rubber.

11. The process of claim 8, where the masterbatch comprises about 10 parts by weight of the dihydrocarbyl succinate per 100 parts by weight of the vulcanizable rubber.

12. The process of claim 8, where the dihydrocarbyl succinate is characterized by a molecular weight in the range of from 300 g/mol to 400 g/mol.

13. The process of claim 12, where the dihydrocarbyl succinate is characterized by an ester content of 99.5% w/w.

14. The process of claim 8, where the dihydrocarbyl succinate is characterized by an ester content of 99.5% w/w.

15. A vulcanizate made from a process comprising a step of:

vulcanizing a vulcanizable composition comprising a vulcanizable rubber, a curative for the vulcanizable rubber, and a dihydrocarbyl succinate, wherein the vulcanizable rubber is selected from the group consisting of natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, epichlorohydrin rubber, and mixtures thereof, wherein the vulcanizable composition includes about 2 to about 20 parts by weight of the dihydrocarbyl succinate per 100 parts by weight of the vulcanizable rubber.

16. The vulcanizate of claim 15, where the vulcanizate is a tire component.

17. The vulcanizate of claim 15, where the vulcanizate is a tire tread.

18. The vulcanizate of claim 15, where the dihydrocarbyl succinate is characterized by a molecular weight in the range of from 300 g/mol to 400 g/mol and an ester content of 99.5% w/w.

19. The vulcanizate of claim 15, where the dihydrocarbyl succinate is di-(2-ethylhexyl) succinate.

20. The vulcanizate of claim 15, where the vulcanizable composition comprises about 10 parts by weight of the dihydrocarbyl succinate per 100 parts by weight of the vulcanizable rubber.

21. The vulcanizable composition of claim 1, where the vulcanizable composition optionally further includes a plasticizer, and where the processing oil, dihydrocarbyl succinate, and plasticizer form a softener component of the vulcanizable composition, and where the vulcanizable composition includes from about 0.1 to about 75 parts by weight of the softener component per 100 parts by weight of the vulcanizable rubber.

22. The vulcanizable composition of claim 21, where the vulcanizable composition optionally further includes a plasticizer, and where the processing oil, dihydrocarbyl succinate, and plasticizer form a softener component of the vulcanizable composition, and where the vulcanizable composition includes from about 10 to about 50 parts by weight of the softener component per 100 parts by weight of the vulcanizable rubber.

23. The vulcanizable composition of claim 22, where the vulcanizable composition further includes from about 10 to about 100 parts by weight filler.

* * * * *